United States Patent [19]
Corliss et al.

[11] 3,720,232
[45] March 13, 1973

[54] FLUID PRESSURE RESPONSIVE VALVE CONTROLLER

[75] Inventors: Robert F. Corliss, Hacienda Heights; Frank Wilkinson, Chatsworth, both of Calif.

[73] Assignee: said Corliss, by said Wilkinson

[22] Filed: April 20, 1971

[21] Appl. No.: 135,729

[52] U.S. Cl..........................137/624.14, 137/624.15
[51] Int. Cl..............................................F16k 31/36
[58] Field of Search.......137/624.14, 624.11, 624.13, 137/624.15, 624.17

[56] References Cited

UNITED STATES PATENTS

| | | | |
|---|---|---|---|
| 2,315,113 | 3/1943 | Watson | 137/624.14 |
| 1,898,248 | 2/1933 | Gaines | 137/624.14 |
| 3,276,469 | 10/1966 | Storm | 137/624.14 |
| 3,105,518 | 10/1963 | Kunz | 137/624.14 |

Primary Examiner—Alan Cohan
Attorney—White, Haefliger & Bachand

[57] ABSTRACT

A water pressure energized controller for a main valve through the body of which system water supply is to be controlled, comprises:

a. a housing attached to said body, b. valving means projecting from the housing for installation and movement within the body to control water flow in the system, and c. control means carried by the housing and responsive to system water pressure to cycle the movement of said valving means at predetermined time intervals.

13 Claims, 8 Drawing Figures

INVENTORS.
ROBERT F. CORLISS
FRANK WILKINSON
BY
White, Haefliger & Bachand
ATTORNEYS.

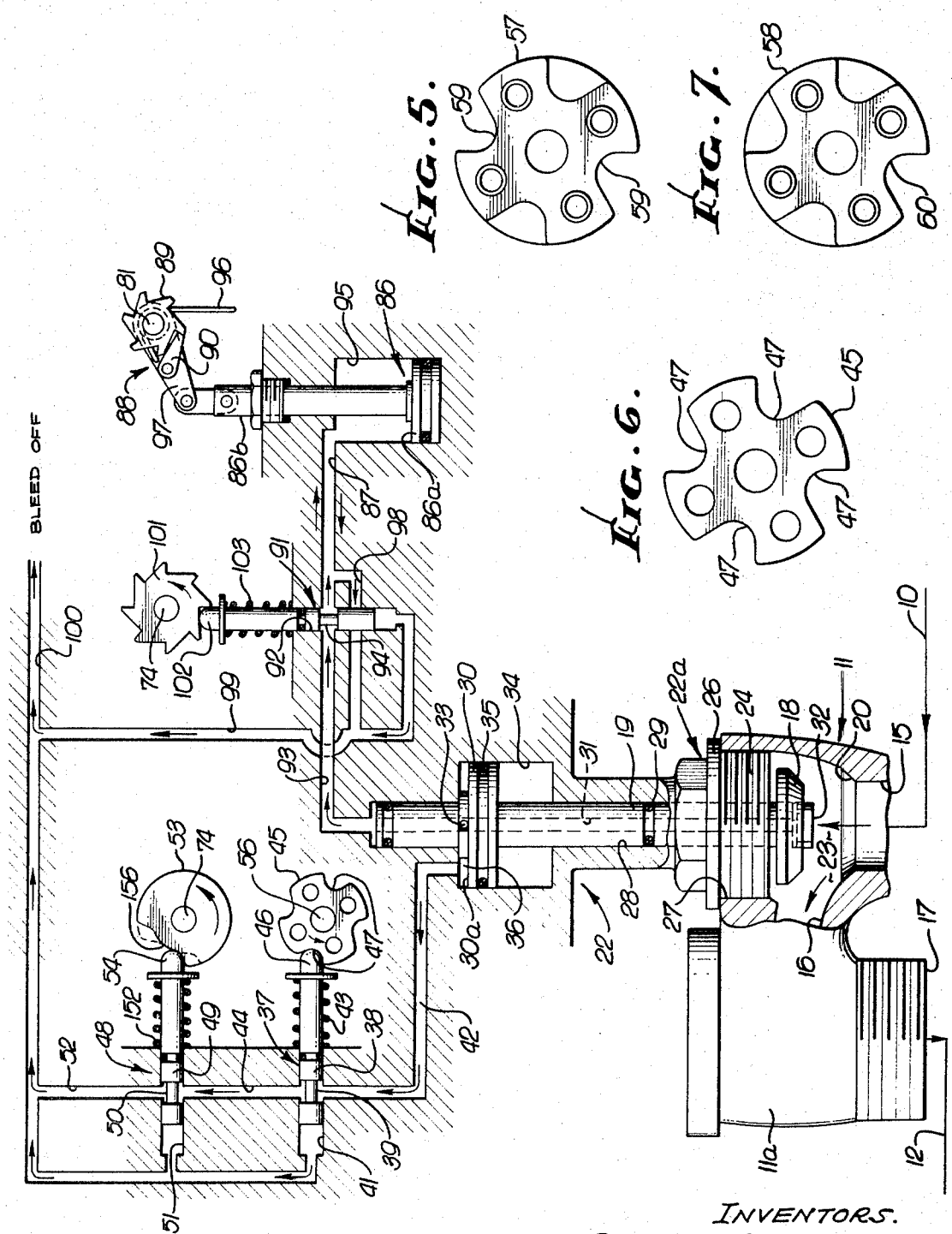

FLUID PRESSURE RESPONSIVE VALVE CONTROLLER

BACKGROUND OF THE INVENTION

This invention relates generally to valve controllers, and more specifically concerns fluid pressure responsive controllers having special application to water supply systems, as for example service lawn or agricultural sprinklers.

In the past, the automatic control of water supply to sprinklers has presented certain problems. These included the requirement of energy supply to the control, and it was thought necessary to utilize electrical energy to operate solenoids and other electrical devices associated with timers and/or water valves. Installation of electrical timers and equipment for such uses is relatively expensive and can lead to problems such as danger of shorting. While efforts have been made to overcome such problems, no controller of which we are aware has provided the unusually advantageous combinations of structure, functioning and results as now are afforded by the present invention.

SUMMARY OF THE INVENTION

It is a major object of the invention to provide, for use in a pressurized water supply system including a main valve body, an easily installable flow controller which derives energy for its operation from the pressure of the water supply, and which operates in a simple, unusually effective manner. Accordingly, problems associated with prior controllers are obviated through use of the invention.

Basically, the invention is embodied in the combination which includes: valving means projecting for installation and movement in the main valve body to control fluid (or water) flow in the system; and, control means adapted to be mounted to or carried on the body (as within a housing supported on the body when the valving means is installed) to be responsive to system fluid pressure to cycle the movement of the valving means at predetermined intervals. As will appear, the valving means may include a stopper projecting for reception in the main valve body (after removal of an existing plug and stopper which normally is manually displaced), the control means including an actuator piston carried to receive application of system fluid pressure. The stopper and piston are typically advantageously mounted on a reciprocable stem containing a passage to communicate fluid pressure from within the valve body to the piston. In this regard, the stopper and piston, operating as a differential pressure responsive unit, have a main valve closing position in which system fluid pressure applied to the piston is dominating and urges the piston and stopper to closing position; likewise, these elements have a main valve opening position in which fluid pressure applied to the stopper is dominant (by virtue of controlled bleed-off of pressure applied to the piston) and the stopper and piston are consequently urged to said opening position, water then being controllably supplied to the sprinklers.

It is further object of the invention to provide said control means to include control valving communicating with the piston in the controller housing and operable to bleed-off fluid pressure applied to the piston during selected time intervals. Such control valving may typically include a first control valve operable to control the bleed to occur during selected first time intervals (as for example one interval each day or multiple thereof); and a second control valve in series communication with the first valve and operable to control the bleed to occur during selected secondary time intervals within the first time intervals (as for example during *x* minute intervals within a *y* hour interval determined by the first valve. Control valve actuating structure may include cam means and follower means, as well as fluid pressure energized means to effect rotation of the cam means to displace the follower or followers, as will be described.

These and other objects and advantages of the invention, as well as details of an illustrative embodiment, will be more fully understood from the following description and drawings, in which:

DRAWING DESCRIPTION

FIG. 4 is schematic showing of the operating principles of the controller;

FIGS. 5–7 are views showing various control cams that may be utilized; and

DETAILED DESCRIPTION

Figure 1:
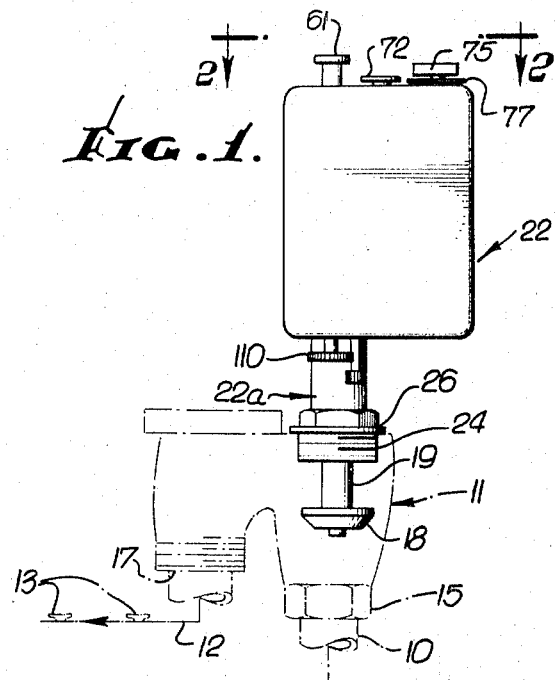
FIG. 1 is a side elevation showing a controller installed on a main valve body in a water supply system.

In FIGS. 1 and 4, a pressurized water supply system may typically include a pressurized water delivery line 10, a main valve body 11 through which water flow is to be controlled, a line 12 to which water flows from body 11, and water sprinklers 13 connected with line 12. It is understood that line 12 may be connected to outlets other than sprinklers, but that the invention is especially useful in combination with urban or agricultural water sprinklers.

Body 11 may have an inlet 15, an intermediate side outlet 16 and a final outlet 17. Water flow through the inlet 15 to outlet 16 may be controlled by a stopper 18 mounted on a stem 19 for movement toward and away from engagement with an annular seat 2 in body 11. Section 11a of the body may contain conventional antisiphoning means to prevent back flow of contaminated water in line 12 to the supply line 10, which may contain potable water.

In accordance with the invention, a control housing 22 is removably attached to body 11 (after removal of an existing manually actuated stopper and plug); valving means projects from the housing 22 for installation and movement within the body to control water flow in the system; and, control means is carried by the housing 22 and is responsive to the system water supply pressure to cycle the movement of the valving means at predetermined time intervals. As a result, no electrical control connection or other structure is required, and very quick and inexpensive installation of the controller is all that is needed.

More specifically, the valving means may include the stopper 18 on stem 19, and which is received in the body chamber 23 in response to thread connection at 24 of the housing extension 22a to body 11. Extension 22a is integral with housing 22 and projects therefrom as shown, a flange 26 engaging the body 11. Thus, the controller may be quickly attached to body 11 after removal of a usual cap engaging body thread 27. Extension 22a contains a bore 28 within which stem 19 is vertically movable, there being a suitable seal 29 sealing off between the stem and bore.

The control means as referred to may advantageously include an actuator piston 30 carried in the housing to receive application of system water pressure, the piston being operatively connected with the stem 19, as for example, being carried thereby. For simplicity, system pressure may be supplied to piston face 30a via passage 31 extending through the stem from inlet 32 to outlet 33; accordingly, system water pressure is always exerted on piston face 30a, so that the piston urges the stopper toward engagement with the seat 20 to maintain the valve in closed position or condition. In this regard, the housing contains a bore 34 within which the piston is movable up and down, a suitable seal being provided at 35.

The piston and stopper also have a main valve opening position or positions, as seen in FIG. 4, and in which system water pressure applied to the stopper urges the stopper, piston, and stem to open position. At such predetermined or controlled times, the water pressure exertion on face 30a is reduced, so that the differential pressure exerted on the stopper and piston is in an upward direction. For this purpose, the control means includes control valving communicating with the piston in the housing and operable to bleed water pressure supplied to the piston face 30a. In this regard, the side outlet 33 from the stem bore may act as a flow regulating orifice, dropping the pressure of water flowing via the stem to the chamber 36 to which the piston face 30a is exposed.

The referred to control valving is shown to include a first control valve 37 operable to control the slow bleed to occur during selected first time intervals, as for example during a certain interval occurring once each day (or portion thereof), or every other day, or once every fourth day, etc. Valve 37 is shown in the form of a stem 38 having a reduced section 39 and working in a bore 41 communicating with chamber 36 via duct 42. A spring 43 urges the stem 38 to the right, and stem 38 then blanks leakage of water via duct 42 to duct 44. Control valve actuating structure includes a rotary cam 45 and a cam follower 46 on the stem. The cam is rotated by water pressure energized means to displace the follower, as for example, to the bleed position shown. Valve 37 is operated or displaced to bleed water flow from duct 42 to duct 44. Cam 45 may be a "one-day" cam, meaning that it is rotated a quarter of a turn each day, the follower 46 dwelling in a cam recess 47 once each day and for a predetermined time interval, as for example, 2 hours.

The control valving may also include a second control valve 48 operable to control the bleed to occur during predetermined second time intervals within the first time intervals. Valve 48 is shown in the form of a stem 49 having a reduced section 50 and working in bore 51 communicating between duct 44 and discharge duct 52. A spring 152 urges the stem 49 to the right, the stem then blanking flow of any fluid in duct 44 to duct 52. Control valve actuating structure includes a rotary cam 53 and a cam follower 54 in the stem. The cam 53 is rotated by water pressure energized means to displace follower 54, as for example, to the bleed position shown, and water only flows to discharge duct 52 from duct 42 when both valves 37 and 48 are in "bleed" or open position, at which time main valve stopper 18 is in open position. Cam 53 may be rotated once every half hour, for example, valve 48 being open during a portion of that period corresponding to the length of time follower 54 dwells in cam recess 156. Thus, valve 48 might be open for 10 minutes each half hour, or 40 minutes during the 2 hours that valve 37 is open each day, these times being arbitrarily chosen merely for illustration.

Referring back to cam 45, FIG. 3 shows mounting thereof on a shaft 56 in the housing 22, along with alternate cams 57 and 58. The cams also appear in FIGS. 5-7, FIG. 6 showing "2-day" cam 57, and FIG. 7 a "4-day" cam 58. Cam 45 has four recesses 47 at 90° intervals; cam 57 has two recesses 59 at 180 degree intervals; and cam 58 has one recess 60. A manually operable plunger 61 may be elevated or depressed at the top of housing 22 to shift the cam group relative to shaft 56 and between three vertical positions, each of which corresponds to positioning of one of the cams in operative relation to plunger 46 (not shown in FIG. 3). For this purpose, the cams may be axially keyed to the shaft 56; and a spring urged detent 62 carried by the plunger 61 may drop successively into detent slots 63, 64, and 65 corresponding to the selected cam positioning. Shaft 56 is mounted at 164 to a cross-piece 165 in the housing; and also to cross piece 78, and a spur gear 66 on the shaft is rotated by a smaller spur gear 67 on a drive shaft 68. The latter is driven by clock drive mechanism 70, via gears 71 and 72. Shaft 68 may revolve once every 12 hours, for example, and an indicator 72 on the upper end of the shaft is rotated relative to the indicia seen in FIG. 2, to indicate the shaft position, hour by hour.

Figure 2:
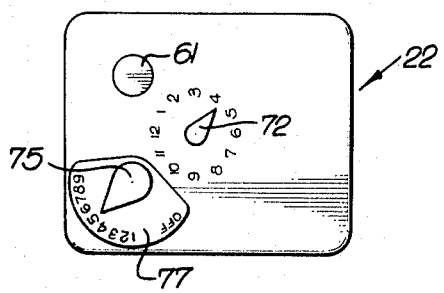
FIG. 2 is a top plan view taken on line 2—2 of FIG. 1.

Shaft 68 also drives shaft 74 to which cam 53 is attached, meshed drive gears 175 and 76 being carried by shafts 68 and 74, the drive ratio being such (for example) that shaft 74 may rotate once every 6 hours. Cam 53 may be shiftable lengthwise of the shaft 34, in response to rotation of a watering time duration selector 75, to thereby shift it relative to the follower 54. With the angular extent of the recess 156 varying as a function of axial displacement of the cam 53 (for example) it is clear that the dwell time of the follower 54 in the recess may be controlled, to control the watering time interval, say between 5 and 90 minutes per revolution of the cam 53. Selector 75 also has an "OFF" position as seen in FIG. 2 and corresponding to an axial position of cam 53 in which no recess extent 56 is presented to the follower 54, so that valve 48 does not bleed despite continued rotation of shafts 68, 56 and 74. In this regard, the indicia relative to which selector 75 is turned may be carried on a plate 77 which turns with shaft 74. Cam 53 and selector 75 may be coupled via worm gear mechanism within the shaft 74, for example. Note mounting of shaft 74 by cross-pieces 165 and 78, in the housing.

Figure 8:
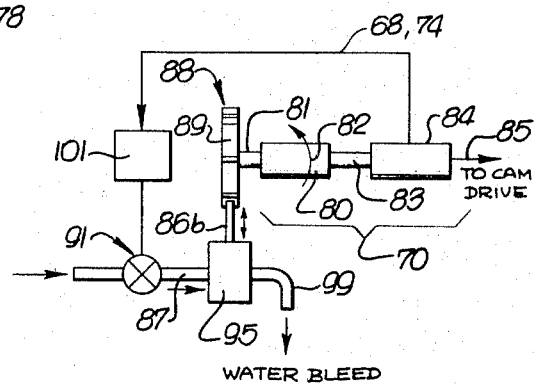
FIG. 8 is a schematic showing of water pressure responsive spring winding mechanism and associated structure.

In accordance with a further aspect of the invention, water pressure energized spring means is operable to transmit force to effect the cycling of the main valve, through operation of the bleed mechanism as described. Referring to FIG. 8, a spring is schematically shown at 80, with winding input at 81 in the rotary direction indicated by arrow 82. The spring output at 83 drives escapement mechanism indicated at 84, and the spring and escapement may be considered as embodied in the clock mechanism 70. Escapement output at 85 drives the described cams, as via the shaft 68 in FIG. 3.

A water pressure energized device to effect winding energization of clock spring 80 may advantageously include a reciprocable plunger 86 (including piston 86a and output shaft 86b) to which water pressure is intermittently transmitted as at 87, as seen in FIGS. 4 and 8; a coupling 88 including a ratchet wheel 89 and dog 90 movable by the plunger 86b to intermittently wind the spring 80; and a further valve 91 movable in response to spring force transmission to control water pressure intermittent transmission to the plunger.

More specifically, when valve 91 is in the position shown in bore 92, pressurized water passes from stem bore 31 and duct 93 past the reduced section 94 of the valve 91 to duct 87 and to the cylinder 95 in which piston 86a works. The water pressure thus transmitted drives the piston down against the force exerted by torsional "return" spring 96, the crank arm 97 attached to plunger 86b driving the dog 90 to rotate the ratchet wheel 89 for incrementally winding the spring 80. Valve 91 is thereafter shifted axially upwardly to block water pressure supply to duct 87, whereupon the return spring 96 acts to elevate the piston 86a to discharge water via duct 87 and outlet ducting 98 and 99 to bleed-off 100. Such shifting of the valve 91 back and forth is effected as by action of the rotary "wind-up" cam 101 upon a follower 102 urged by spring 103 against cam 101. The latter cam may be mounted on shaft 74 in housing 22 as seen in FIG. 3.

Accordingly, water pressure may be used in the manner described to energize the clock spring 80 which in turn drives the cams which control bleed-off and consequent stroking of the main piston 30 and main valve stopper 18, with desired selective timing, all automatically.

Figure 3:
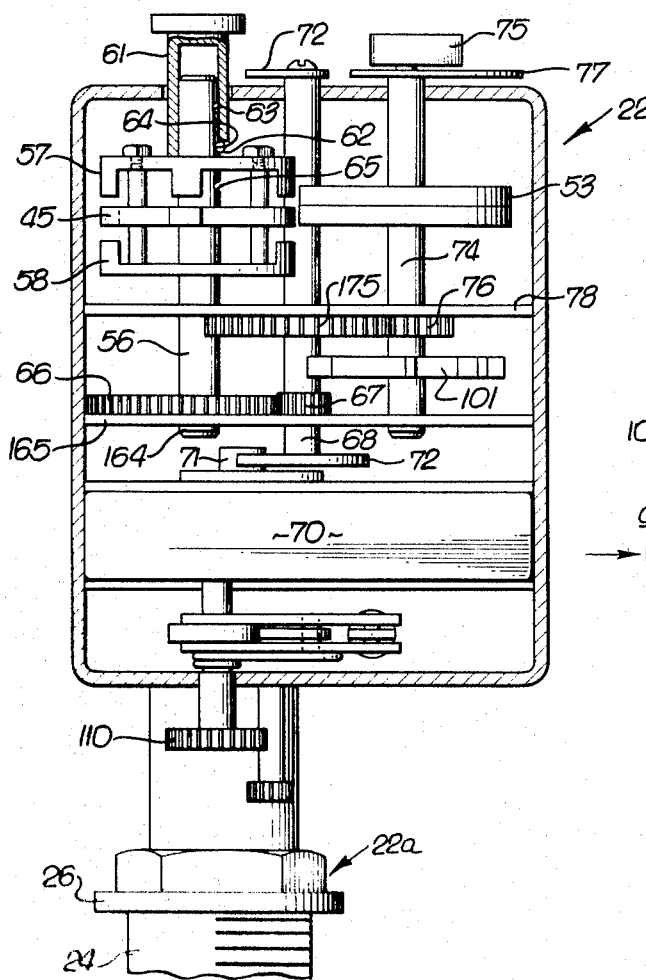
FIG. 3 is an enlarged vertical section taken through the FIG. 1 controller.

Initially, the spring 80 may be manually wound, as by the means 110 projecting below the housing 22, as seen in FIG. 3.

We claim:

1. In a pressurized water supply system including a main valve body through which water flow is to be controlled, the combination comprising
   a. a housing attached to said body,
   b. valving means projecting from the housing for installation and movement within the body to control water flow in the system, the valving means including a stopper receivable in the valve body, and
   c. control means carried by the housing and responsive to system water pressure to cycle the movement of said valving means at predetermined time intervals, the control means including an actuator piston carried in the housing to receive application of said pressure,
   d. the stopper and piston being interconnected and have a main valve closing position in which system water pressure applied to the piston urges the piston and stopper to said closing position, and a main valve opening position in which system water pressure applied to the stopper urges the stopper and piston to said opening position,
   e. the control means including control valving communicating with the piston in the housing and operable to bleed water pressure supplied to the piston at times when the piston is in said main valve opening position, the control valving including a first control valve operable to control the bleed to occur during selected first time intervals, and a second control valve in series communication with the first control valve and operable to control the bleed to occur during predetermined second time intervals within said first time intervals.

2. The combination of claim 1 wherein the valving means includes a stem on which the stopper and piston are carried, the stem containing a passage to communicate said pressure from within the valve body to the piston in the housing.

3. The combination of claim 1 wherein the control means includes control valve actuating structure having a rotary cam and a cam follower, and water pressure energized means to effect rotation of the cam to displace the follower for operating the control valving.

4. The combination of claim 1 wherein said control means includes water pressure energized spring means operable to transmit force to effect said cycling.

5. The combination of claim 1 wherein said control means includes control valve actuating structure having a first group of rotary cams and a cam follower operatively engaged with a selected cam of said first group, and a manual selector exposed at the housing exterior and movable to position a selected cam of said first group in operative engagement with said follower, the cams characterized as being unlike.

6. The combination of claim 5 wherein said structure has a second cam and another cam follower operatively engaged therewith.

7. The combination of claim 3 wherein said last named means includes a spring, spring energized drive mechanism to rotate the cam, and a water pressure responsive device to effect energization of the spring.

8. In a pressurized water supply system including a main valve body through which water flow is to be controlled, the combination comprising
   a. a housing attached to said body,
   b. valving means projecting from the housing for installation and movement within the body to control water flow in the system, the valving means including a stopper receivable in the valve body, and
   c. control means carried by the housing and responsive to system water pressure to cycle the movement of said valving means at predetermined time intervals, the control means including an actuator piston carried in the housing to receive application of said pressure,
   d. the stopper and piston being interconnected and have a main valve closing position in which system water pressure applied to the piston urges the piston and stopper to said closing position, and a main valve opening position in which system water pressure applied to the stopper urges the stopper and piston to said opening position, e. the control means including control valving communicating with the piston in the housing and operable to bleed water pressure supplied to the piston at times when the piston is in said main valve opening position, f. the control means also including control valve actuating structure having a rotary cam and a cam follower, and water pressure energized means to effect rotation of the cam to displace the follower for operating the control valving, said last named means including a spring, spring energized drive mechanism to rotate the cam, and a water pressure responsive device to effect energization of the spring, said device including a reciprocable plunger to which water pressure is intermittently transmitted, a coupling including a ratchet movable by the plunger to intermittently wind the spring, and a further valve movable in response to spring force transmission to control water pressure intermittent transmission to the plunger.

9. For use in a pressurized liquid supply system including a main valve body through which fluid flow is to be controlled, the combination comprising a. valving means projecting for installation and movement in the body to control fluid flow in the system, the valving means including a stopper projecting for reception in the means valve body, and b. control means adapted to be mounted on the body and responsive to fluid pressure to cycle the movement of said valving means at predetermined time intervals, the control means including an actuator piston carried to receive application of said pressure, c. the stopper and piston being interconnected and having a main valve closing position in which fluid pressure applied to the piston urges the piston and stopper to said closing position, and a main valve opening position in which fluid pressure applied to the stopper urges the stopper and piston to said opening position, d. the control means including control valving communicating with the piston and operable to bleed fluid pressure supplied to the piston at times when the piston is in said main valve opening position, the control valving including a first control valve operable to control the bleed to occur during selected first time intervals, and a second control valve in series communication with the first control valve and operable to control the bleed to occur during predetermined second time intervals within said first time intervals.

10. The combination of claim 9 wherein the valving means includes a stem on which the stopper and piston are carried, the stem containing a passage to communicate said pressure from within the valve body to the piston.

11. The combination of claim 9 wherein the control means includes control valve actuating structure having a rotary cam and a cam follower, and fluid pressure energized means to effect rotation of the cam to displace the follower for operating the control valving.

12. The combination of claim 9 wherein said control means includes fluid pressure energized spring means operable to transmit force to effect said cycling.

13. The combination of claim 12 wherein said last named means includes a spring, spring energized drive mechanism to rotate the cam, and a fluid pressure responsive device to effect energization of the spring.

* * * * *